(12) United States Patent
Murai et al.

(10) Patent No.: US 6,490,344 B1
(45) Date of Patent: Dec. 3, 2002

(54) COMMUNICATION SYSTEM AND COMMUNICATION CHANNEL COUPLING METHOD

(75) Inventors: Toshio Murai, Ichikawa (JP); Shuichi Sato, Sagamihara (JP); Sen Yanagi, Urawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 330 days.

(21) Appl. No.: 09/609,108

(22) Filed: Jun. 30, 2000

(30) Foreign Application Priority Data

Oct. 4, 1999  (JP) ............................................. 11-282401

(51) Int. Cl.⁷ ............................................. H04M 11/00
(52) U.S. Cl. ............................... 379/93.08; 375/265.09; 348/14.11
(58) Field of Search ........................ 379/93.08, 90.01, 379/91.02, 265.01, 265.02, 265.05, 265.09, 265.1, 265.11; 348/14.01, 14.08, 14.11; 370/352, 356

(56) References Cited

U.S. PATENT DOCUMENTS 5,937,057 A * 8/1999 Bell et al. ............... 379/265.02

6,323,894 B1 * 11/2001 Katz ........................ 379/14.08

FOREIGN PATENT DOCUMENTS

| JP | 9-161722 | 6/1997 |
| JP | 9-324293 | 12/1997 |
| WO | 98/41042 | 9/1998 |

OTHER PUBLICATIONS

Katsunori Yoshihara et al., "Multimedia Information Communication System", Ser. No. 09/242,455 filed, Feb. 17, 1999.

Toshio Nishida, "Pri vate Branch Exchange", Ser. No. 09/180,585 filed, Nov. 12, 1998.

* cited by examiner

Primary Examiner—Melur Ramakrishnaiah
(74) Attorney, Agent, or Firm—Finnegan, Henderson, Farabow, Garrett & Dunner, L.L.P.

(57) ABSTRACT

In a communication system, a call setup request is sent from a control unit to a first connection unit and a second connection unit to record the communication channel information of the opposite parties. And, the recorded communication channel information of the second connection unit is sent from the control unit to the first connection unit, and the communication channel information of the first connection unit is sent to the second connection unit. As a result, the first connection unit and the second connection unit are allowed to hold information communication by using their mutual communication channel information.

17 Claims, 15 Drawing Sheets

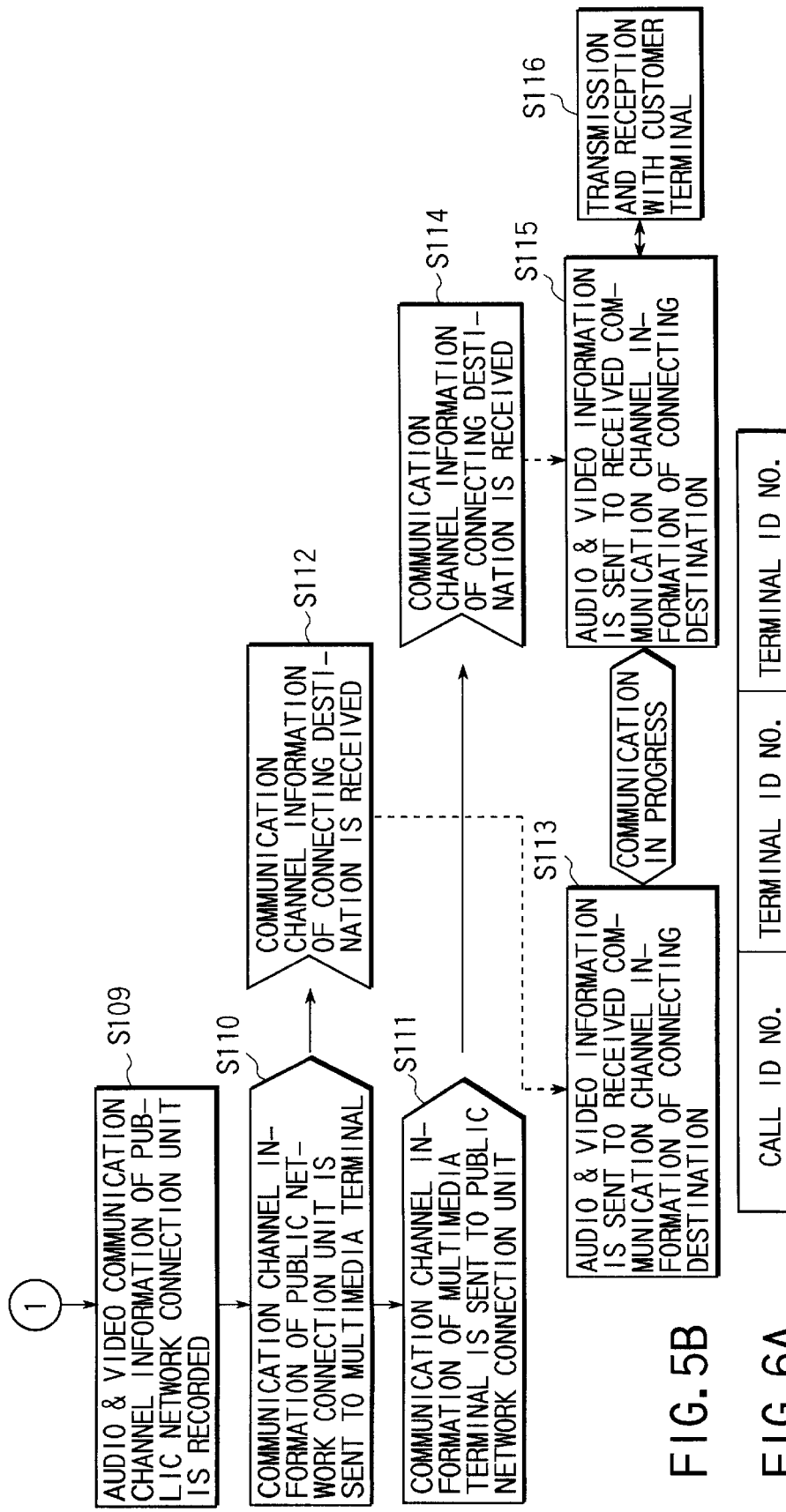

COMMUNICATION SYSTEM AND COMMUNICATION CHANNEL COUPLING METHOD

CROSS-REFERENCE TO RELATED APPLICATIONS

This application is based upon and claims the benefit of priority from the prior Japanese Patent Application No. 11-282401, filed Oct. 4, 1999, the entire contents of which are incorporated herein by reference.

BACKGROUND OF THE INVENTION

The present invention relates to a communication system and communication channel coupling method. In the communication system, more than one multimedia terminal (customer terminal) connected to a public network and having a function to send/receive audio or video or audio and video information, a multimedia terminal (operator terminal) located on a LAN (Local Area Network) and having a function to send/receive audio and video information, a public network connection unit having a function to send/receive information between a public network and a LAN, or a plurality of multimedia terminals and a plurality of public network connection units are arranged on a network. According to the present invention, the communication system is allowed to provide connection control between the multimedia terminals, between the multimedia terminal and the public network connection unit, or between the public network connection units.

Along with the evolution of Internet, increased is the number of systems wherein various desired types of information services are acquired through access to the computers of information service providers from users' terminals. Furthermore, information services and commodity transactions are conducted with vocal answer while users dial up the computer systems of service providers from their telephones.

FIG. 13 is a diagram showing a conventional system configuration designed to interconnect operator terminals and user terminals. The information service system is provided with operator terminals 110 and 120, a server 100 which stores various types of service information and control information, and a PBX (Private Branch Exchange) 130 which performs information switching connections. The PBX 130 is connected to user terminals 150 and 160 via a public network 140, and connection between the operator terminals 110 and 120 and the user terminals 150 and 160 is performed by the PBX 130.

For example, if the user terminal 150 issues a communication request, the PBX 130 receives it and searches the server 100 to find an idle operator. Once the connection between that operator terminal (e.g., 110) and the PBX 130 is established, information communication is held between the operator terminal 110 and the user terminal 150 via the PBX 130. When the operator terminal 120 needs to generate a call, it searches the server 100 to acquire the telephone number of the user terminal. Once the connection between the operator terminal 120 and the PBX 130 is established, the PBX 130 calls the user terminal (e.g., 160) via the public network 140, and after its answer is confirmed, information communication is carried on between the operator terminal 120 and the user terminal 160.

In conventional information service systems, the PBX performs control on connections between terminals. For this reason, the conventional systems accommodate a dedicated unit to interconnect a switching unit and trunk lines for transmission and reception of audio and video information. There is no system implemented wherein audio and video information from a users' telephone or a personal computer terminal connected to a public network is received at an operator terminal via a LAN in a computer system; or audio and video information from an operator terminal is transmitted to a users' telephone or a personal computer terminal via a LAN in a computer system and, further, via a public network. For this reason, it is necessary to go through a dedicated PBX in order to establish information communication between a user terminal and an operator terminal, which made the system very costly.

BRIEF SUMMARY OF THE INVENTION

This invention has been made in view of the situation described above, and allows to build up an information providers' computer system with a server computer, etc. And, more than one operator terminal, more than one public network connection unit, and a control unit which controls connections (e.g., a call-generating unit, an answering unit, a connection control unit, a terminal, etc.) are connected on a LAN, so that the units interconnected on the LAN can hold high-speed communications between themselves by means of packet communication using TCP (Transmission Control Protocol), UDP (User Datagram Protocol), etc., and the public network connection unit and user terminals on the public network can perform conventional telephone line communications. Consequently, it is an object of the invention to provide a communication system and communication channel coupling method that can establish connection between user terminals (via a public network connection unit) and operator terminals, connection between operator terminals, and connection between user terminals (via two public network connection units) by simple procedures.

According to a first aspect of the present invention, there is provided a communication channel coupling method in a communication system wherein one or a plurality of multimedia terminals having a function to send/receive audio or video or audio and video, one or a plurality of public network connection units having a function to send/receive audio and video between the multimedia terminal and the public network connection unit or between a public network and a LAN, and a control unit are arranged on the LAN, the method being arranged to provide connection between the multimedia terminals, between the multimedia terminal and the public network connection unit, or between the public network connection units, and comprising the steps of:

causing the control unit to send a call setup request to a first connection unit, and then to record audio and video communication channel information of the first connection unit which is obtained in response to the call setup request, so as to establish an audio and video communication channel;

causing the control unit to send the call setup request to a second connection unit, and then to record audio and video communication channel information of the second connection unit which is obtained in response to the call setup request, so as to establish an audio and video communication channel;

causing the control unit to send the audio and video communication information of the second connection unit to the first connection unit;

causing the control unit to send the audio and video communication information of the first connection unit to the second connection unit; and establishing communication between the first connection unit and the second connection unit.

According to the first aspect, it is readily possible to implement communication coupling by sending a call setup request from a control unit (e.g., an automatic call-generating unit, an automatic answering unit, a connection control unit, a terminal, or a unit comprising a combination thereof) to the first and second connection units desired to interconnect, and mutually indicating the communication channel information contained in their answer signals.

According to a second aspect of the present invention, there is provided a communication channel coupling method in a communication system wherein one or a plurality of multimedia terminals having a function to send/receive audio or video or audio and video, one or a plurality of public network connection units having a function to send/receive audio and video between the multimedia terminal and the public network connection unit or between a public network and a LAN, and a control unit are arranged on the LAN, the method being arranged to provide connection between the multimedia terminals, between the multimedia terminal and the public network connection unit, or between the public network connection units, and comprising the steps of:

causing the control unit to send a first call setup request to a first connection unit, and to mutually send/receive communication channel information therebetween;

causing the control unit to send the first call setup request to a second connection unit, and to mutually send/receive communication channel information therebetween;

causing the control unit to send a transfer request to the first connection unit, after communication between the control unit and the first and second connection units is established;

causing the first connection unit, which has received the transfer request, to send a second setup request to second connection unit, so as to cause the first and second connection units in response thereto to mutually send/receive communication channel information therebetween through the control unit;

causing the first and second connection units to disconnect communication with the control unit, after the first and second connection units mutually receive the communication channel information therebetween; and establishing communication between the first connection unit and the second connection unit.

According to the second aspect, it is readily possible to implement communication coupling by sending a call setup request from the control unit to the first and second connection units desired to be interconnected, by receiving the communication channel information contained in their answer signals, and thereafter, by indicating the mutual communication channel information between the first connection unit and the second connection unit, pursuant to a communication channel transfer request, while disconnecting all the communication channels between the control unit and the first connection unit and between the control unit and the second connection unit.

According to a third aspect of the present invention, there is provided a communication channel coupling method in a communication system wherein one or a plurality of multimedia terminals having a function to send/receive audio or video or audio and video, one or a plurality of public network connection units having a function to send/receive audio and video between the multimedia terminal and the public network connection unit or between a public network and a LAN, and a control unit are arranged on the LAN, the method being arranged to provide connection between the multimedia terminals, between the multimedia terminal and the public network connection unit, or between the public network connection units, and comprising the steps of:

causing the control unit to send a call setup request to first and second connection units, and to mutually send/receive communication channel information therebetween;

causing the control unit to send the communication channel information of the second connection unit and a communication channel change request to the first connection unit, and to send the communication channel information of the first connection unit and the communication channel change request to the second connection unit, after communication between the control unit and the first and second connection units is established;

causing the first and second connection units, which have received the communication channel change request, to record the communication channel information of the second and first connection units, respectively, and to terminate communication with the control unit; and establishing information communication through a communication channel thus changed between the first connection unit and the second connection unit.

According to the third aspect, it is possible to couple a communication channel for audio and video signals between the first connection unit and the second connection unit desired to interconnect, while the control line between the control unit (e.g., a call-generating unit, an answering unit, a connection control unit, or a terminal, etc.) and the first and second connection units is held on, by sending a call setup request from the control unit to the first and second connection units, by receiving the communication channel information contained in the received answer signals and establishing the connection, and by indicating the communication channel information and communication channel transfer request of the second connection unit to the first connection unit, and indicating the communication channel information and communication channel transfer request of the first connection unit to the second connection unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5A and 5B are diagrams showing an operation of the first embodiment of a coupling processing between terminals in an automatic call generation system or an automatic answering system according to the present invention;

FIGS. 6A and 6B are diagrams showing an example of the record of communication channel information, etc., pertaining to a coupling processing between terminals in an automatic call generation system or an automatic answering system according to the present invention;

DETAILED DESCRIPTION OF THE INVENTION

The embodiments of the communication systems related to the present invention will be described below.

Figure 1:
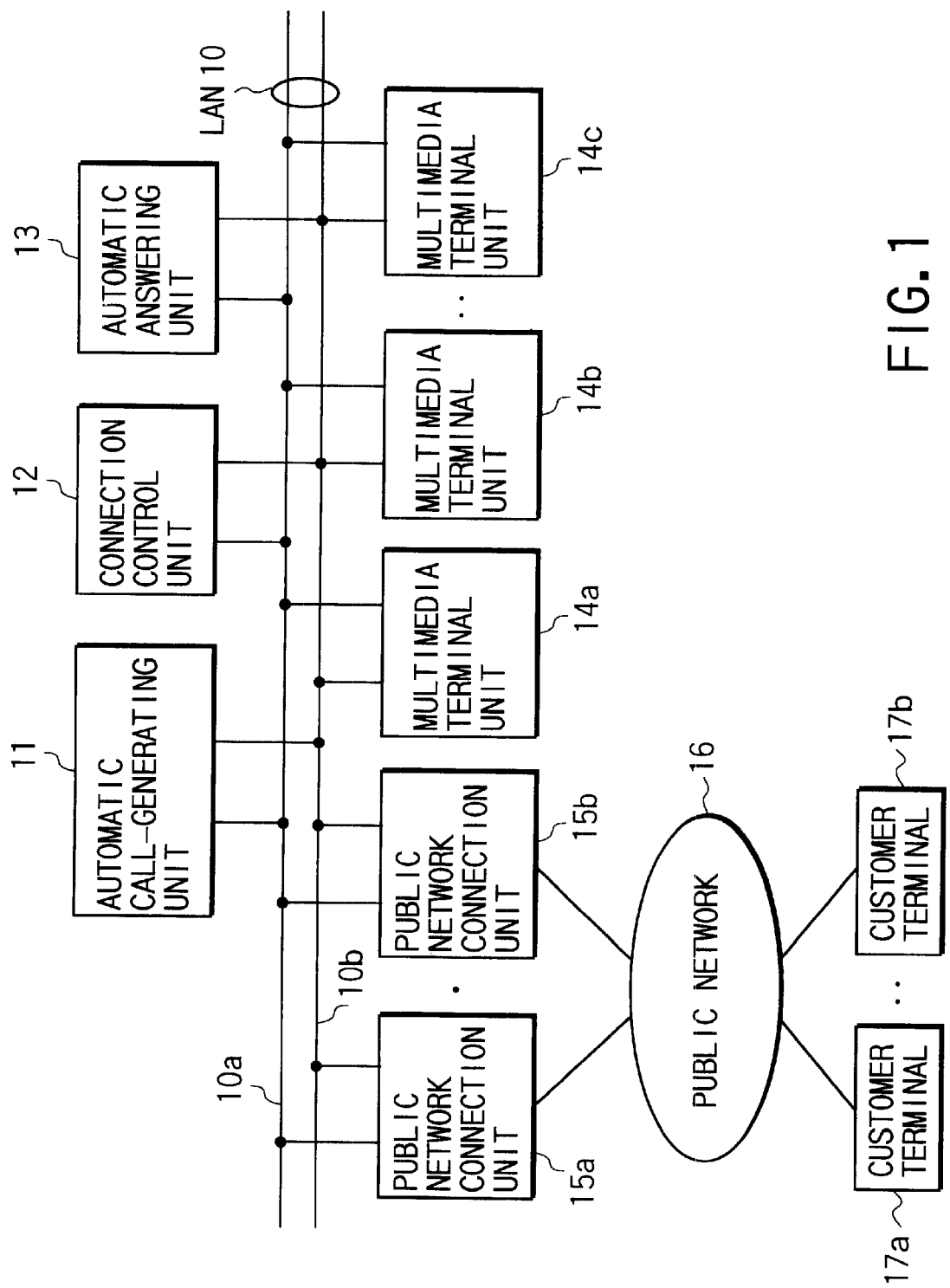
FIG. 1 is a schematic diagram showing the overall configuration of a communication system according to the present invention.

FIG. 1 shows the overall configuration of a communication system according to the present invention. For example, the information service computer system includes the following members connected to a local area network (LAN) 10: an automatic call-generating unit 11, which decides the number of call generations and performs actual call generations and disconnections, connections to the operator terminals after connecting to a called party, and various types of information management; a connection control unit 12, which performs a connection processing (e.g., acceptance of a call generation request, decision of a receiving party based on a receiving party information contained in the call generation request, function to let the calling and receiving parties hold audio and video communication, and so forth) on the network LAN; an automatic answering unit 13, which performs a terminating processing for a call from the public network, selection of appropriate terminals, connection to target terminals, etc.; multimedia terminal units 14a, 14b, and 14c, which are used by operators as operator terminals for speech or information input; and public network connection units 15a and 15b, which interconnect the terminals of customers who are users and this computer system via the public network 16. The terminals 17a, 17b, - - - of customers who are users, are connected to the public network 16 to which the public network connection units 15a and 15b are linked. The customer terminals 17a and 17b comprise telephones, personal computer terminals, mobile terminals, and so forth.

In this embodiment, the LAN 10 comprises a control communication channel 10a which transfers control signals, such as a call generation request, a terminating request, etc., and an audio and video communication channel 10b which transmits audio and video information. Although this embodiment shows the case where TCP is employed for the control communication channel 10a and UDP for the audio and video communication channel 10b, either communication channel 10a or 10b can use either TCP or UD. When TCP and UDP are adopted, IP (Internet Protocol) addresses and port Nos. are used as communication channel information for purposes of connection control between terminals. In the case where protocols and communication means other than TCP and UDP are employed, it will be necessary to use information that enables the communication channels to be identified uniquely. Moreover, although the following example employs Q.931 conforming to the ISDN (Integrated Services Digital Network) standard widely in use as a call connection procedure, other signals may as well be employed.

Figure 2:
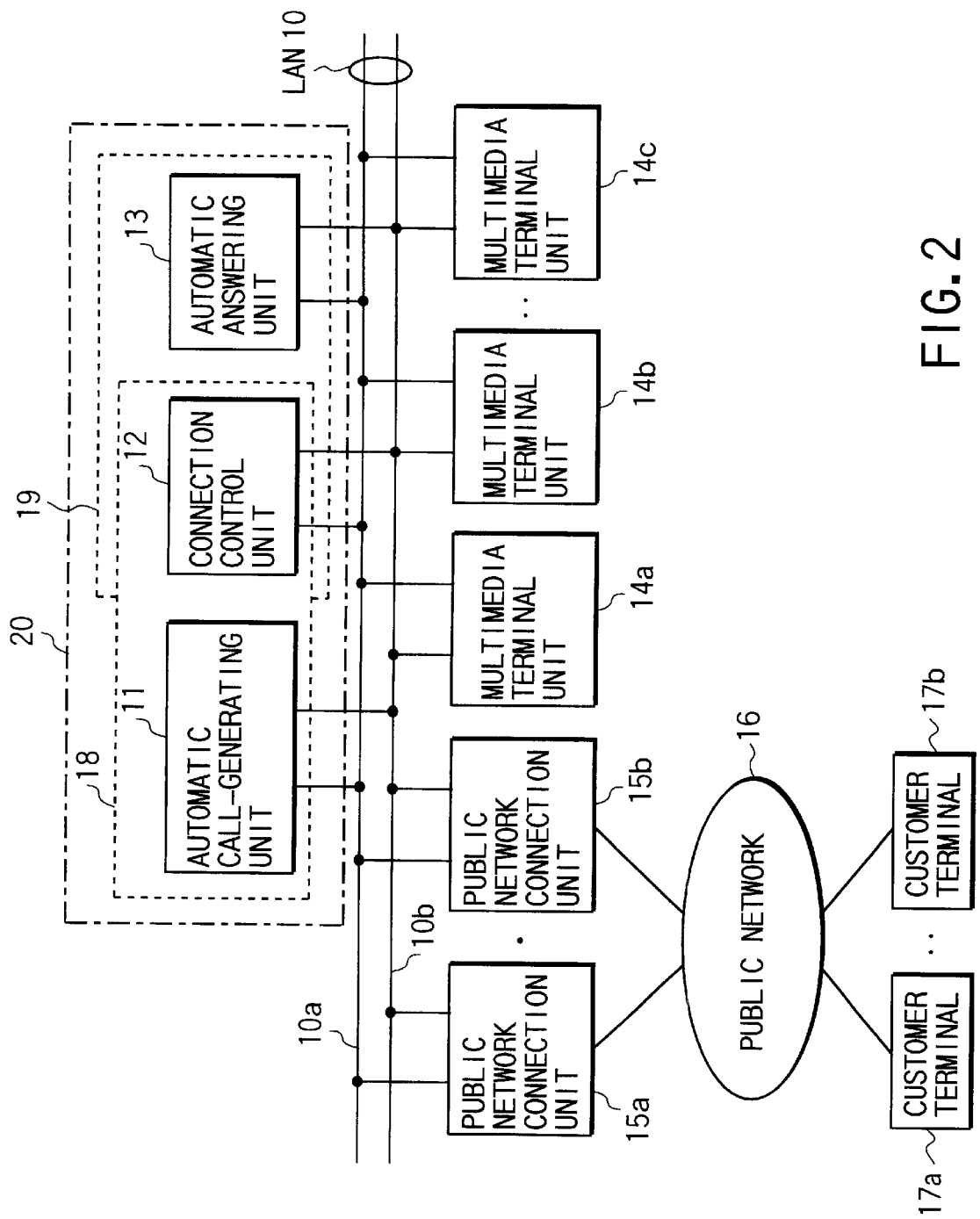
FIG. 2 is a schematic diagram showing the overall configuration of another communication system according to the present invention.

FIG. 2 illustrates another example of system configuration according to the present invention, wherein the same reference numbers are assigned to the same units as in FIG. 1. In the communication systems shown in FIG. 1 and FIG. 2, an automatic call generation system is formed of the automatic call-generating unit 11, the connection control unit 12, the multimedia terminal unit 14, the public network connection unit 15, and so forth. In this automatic call generation system, the automatic call-generating unit 11 and the connection control unit 12 can as well be formed of one computer 18. Moreover, in the communication systems shown in FIG. 1 and FIG. 2, an automatic answering system is formed of the automatic answering unit 13, the connection control unit 12, the multimedia terminal unit 14, the public network connection unit 15, and so forth. In this automatic answering system, the automatic answering unit 13 and the connection control unit 12 can as well be formed of one computer 19. Furthermore, the automatic call-generating unit 11, the connection control unit 12, and the automatic answering unit 13 can as well be formed of one computer 20.

Next, a processing operation covering from decision of the number of call generations through disconnection will be explained with reference to FIG. 3.

First, the automatic call-generating unit 11 calculates the number of calls to be generated by using operator information and circuit information containing past records at a certain timing (Step S10). Then, the automatic call-generating unit 11 generates calls to the required number of operator multimedia terminal units 14a, 14b, 14c, - - -, based on the number obtained by calculation (Step S11). The operators manipulating the multimedia terminal units 14a, 14b, and 14c send answer signals in response to calling requests from the automatic call-generating unit 11 by operating their terminal units, and the automatic call-generating unit 11 detects those answer signals arriving from the operator multimedia terminal units 14a, 14b, and 14c (Step S12).

Next, the automatic call-generating unit 11 generates a plurality of calls to the customer terminals 17a, 17b, - - -, which are connected to the public network 16, based on the results of calculation (Step S13). If the automatic call-generating unit 11 detects an answer signal from the called customer terminals 17a, 17b, - - - (If Yes at Step S14), it selects the operator who should hold speech with the called customer (Step S15). It verifies that the multimedia terminal unit of that operator has already been connected by the call, and couples the multimedia terminal unit of the operator to the called customer terminal (Step S16). Thereafter, the communication between the operator and the called customer is carried on using their respective terminals (Step S17), and then the communication is disconnected by the operator multimedia terminal unit or the called customer terminal at such a point as the speech is finished (Step S18). Moreover, if no answer signal is detected from the customer terminal at Step S14, because the called customer terminal is busy or connection could not be established due to the called party being out of the area, the call is disconnected.

Figure 4:
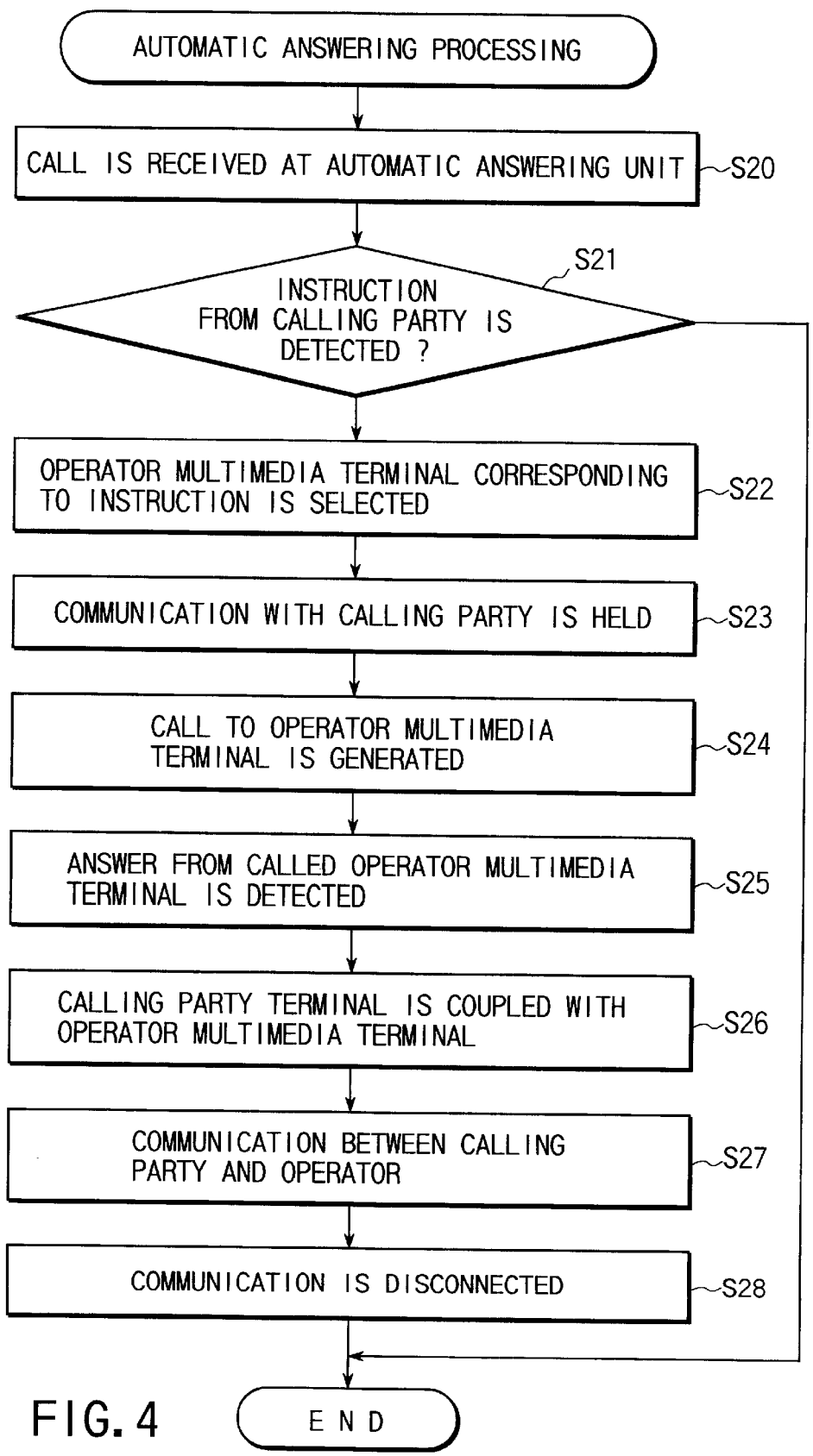
FIG. 4 is a flowchart showing a processing procedure in an automatic answering system according to the present invention.

Next, the operation of the automatic answering system covering from call reception through disconnection will be described with reference to FIG. 4.

When the information service system is accessed from a customer terminal (e.g., 17b) via the public network 16 and a public network connection unit (e.g., 15a), the signal is received by the automatic answering unit 13 (Step S20). The automatic answering unit 13 returns an answer message to the calling party (i.e., the customer terminal 17b) and waits for some instruction to be transmitted from the calling party. When some instruction arrives from the calling party who operates a telephone button or issues it in voice, the automatic answering unit 13 detects the instruction signal from the customer (Step S21), chooses an operator who is suitable to process that instruction, and selects the multimedia terminal unit of that operator (e.g., 14a) (Step S22).

Next, the automatic answering unit 13 puts the communication with the calling party on hold (Step S23) and generates a call to the multimedia terminal unit of the selected operator terminal unit 14a (Step S24). The operator returns an answer signal from the multimedia terminal unit 14a to the automatic answering unit 13, and when the automatic answering unit 13 detects that answer signal (Step S25), it couples the calling party terminal 17b being put on hold to the multimedia terminal unit 14a desired to connect (Step S26). Consequently, the communication between the customer terminal 17b and the operator multimedia terminal unit 14a is started (Step S27), and then the communication is disconnected by the customer terminal 17b or the multimedia terminal unit 14a at such a point as the speech is finished (Step S28).

Preferred embodiments of a coupling processing via the LAN 10 for the "the called party terminal and the operator multimedia terminal is coupled" shown at Step S16 of the automatic call-generating system described above and for the "the calling party terminal and the operator multimedia terminal is coupled" shown at Step S26, and other applicable connection processings of the present invention will be described below.

The communication forms performed by the present invention are roughly divided into the following three forms:

First one is communication between a plurality of multimedia terminals. The connection control in this case can be implemented by an automatic call-generating unit, automatic answering unit, connection control unit, multimedia terminal unit, or a combination of those. Packet communication of audio and video information, etc., is carried out by LAN communication at high speed between the multimedia terminals.

Second one is communication between a multimedia terminal and a public network connection unit. The connection control in this case can be implemented by an automatic call-generating unit, automatic answering unit, connection control unit, multimedia terminal unit, or a combination of those. The public network connection unit is connected to a customer terminal over the telephone line via the public network to facilitate audio and video information communication, while, on the LAN, the audio and video information is exchanged with the multimedia terminal units by means of packet communication.

Third one is communication between a plurality of public network connection units. The connection control in this case can be implemented by an automatic call-generating unit, automatic answering unit, connection control unit, multimedia terminal unit, or a combination of those. This form of communication applies to the case where each individual public network connection unit is connected to a customer terminal over the telephone line via the public network, thereby facilitating audio and video communication between customer terminals via the public network connection units.

In order to realize these communication forms, the public network connection units and the multimedia terminal units are provided with a function to send audio and video information converted into packets onto the LAN, and a function to output the packet data converted into audio and video signals. Moreover, the control units have their respective proper functions, but their basic processings relating to the connection control remain unchanged.

The following description deals with the connection between a multimedia terminal unit (e.g., terminal 14a) and a public network connection unit (e.g., unit 15a), and the communication with a customer terminal (e.g., terminal 17b) via the public network 16 in the automatic call generation system.

First Embodiment

Figure 5A:
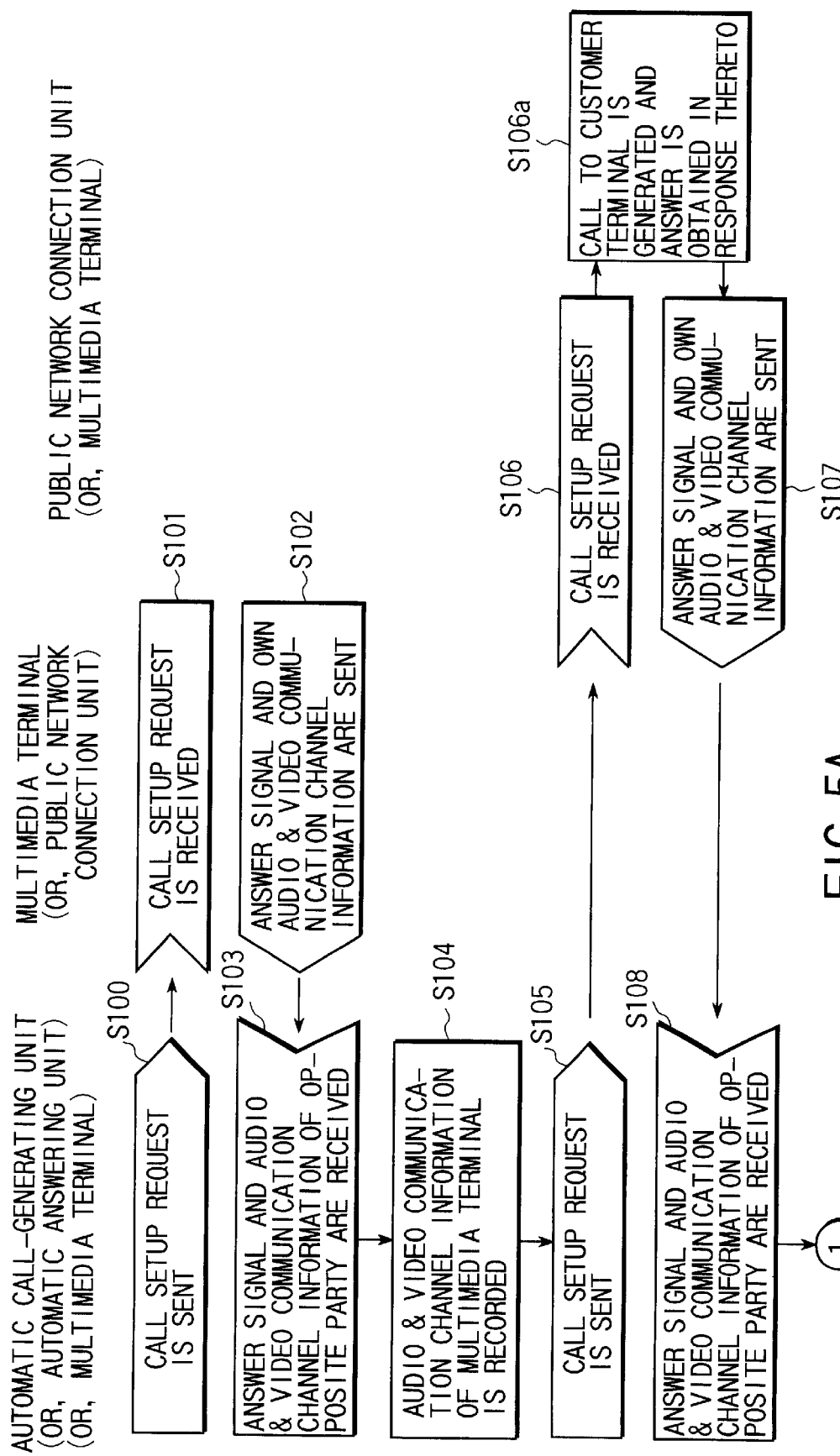

FIGS. 5A and 5B show a flowchart of operation showing a coupling procedure of the first embodiment of the present invention. First, to execute the processing of Step S16 (or Step S26) described above, the automatic call-generating unit 11 (which, hereinafter, should read the automatic answering unit 13 in the case of the automatic answering system) sends a call setup request to the multimedia terminal unit 14a (hereinafter referred to as the terminal 14a) (S100). The terminal 14a receives the call setup request (S101) and sends an answer signal and the port No., IP address of the own terminal, etc., used by the linked audio and video communication channel, as an audio and video communication channel information (S102). Incidentally, in the embodiment, the answer signal to the call setup request and the audio and video communication channel information of the own terminal are sent together, but they may as well be transmitted in separate signals. Moreover, negotiation is required on, e.g., an encoding system of the audio and video information to be used. Information on this negotiation may also be sent simultaneously with the answer signal, or may as well be transmitted separately.

The automatic call-generating unit 11 receives the answer signal and the audio and video communication channel information (i.e., IP address, port No., etc.) sent from the terminal 14a (S103) and records the telephone number, computer name, name of the operator using the terminal 14a, and so on, along with the audio and video communication channel information, using the terminal ID No. of the terminal 14a as a key (S104). FIGS. 6A and 6B show the called party information recorded in the automatic call-generating unit 11 (FIG. 6A) and the obtained communication channel information corresponding to the terminal ID number of the called terminal 14a (FIG. 6B).

Then, the automatic call-generating unit 11 issues a call setup request to the public network connection unit 15a in order to connect with the customer terminal 17b which has been defined as the called party (or calling party) at Step S14 (or Step S21 in FIG. 4) (S105). At the reception of the call setup request (S106), the public network connection unit 15a sends the request to the customer terminal 17b already obtained via the public network 16 over the telephone line and obtains an answer from the customer terminal 17b (S106a). And, the public network connection unit 15a sends the answer signal and its own audio and video communication channel information (IP address, port No., etc.) to the automatic call-generating unit 11 (S107). The automatic call-generating unit 11 receives (S108) and records (S109) the answer and the audio and video communication channel information arriving from the public network connection unit 15a.

Then, the automatic call-generating unit 11 sends the audio and video communication channel information of the public network connection unit 15a to the terminal 14a (S110), and also sends the audio and video communication channel information of the terminal 14a to the public network connection unit 15a (S111). Consequently, the terminal 14a receives the audio and video communication channel information of the public network connection unit 15a (S112), and the public network connection unit 15a receives the audio and video communication channel information of the terminal 14a (S114). As a result, audio signals entered through the microphone of the terminal 14a, etc., or image information entered through a camera, etc., are transferred to the public network connection unit 15a via the LAN 10 (S113). And, the public network connection unit 15a transmits the received audio and video signals to the customer terminal 17b by telephone line connection via the public network 16 (S116). Moreover, the audio and video information transmitted from the customer terminal 17b is similarly received by the public network connection unit 15a via the public network 16 (S116). The public network connection unit 15a sends the received audio and video information to the terminal 14a via the LAN 10 (S115). In this way, the information communication channel between the terminal 14a and the public network connection unit 15a is established by the automatic call-generating unit 11 or the automatic answering unit 13. Thereafter, the terminal 14a and the customer terminal 17b are engaged in a call via the public network connection unit 15a, thereby giving rise to an exchange of requests and answers about various types of information providing services.

In the embodiment described above, the processings of Step S106a and Step S116 will be omitted in the case of a communication between multimedia terminals, transmissions being made directly from the multimedia terminals.

Moreover, in the case of a communication between public network connection units, similar transmission and reception to those of Step S106a will be conducted between Step S101 and Step S102. And, at Step S113, similar transmission and reception to those of Step S116 will be carried out.

Second Embodiment

Figure 7A:
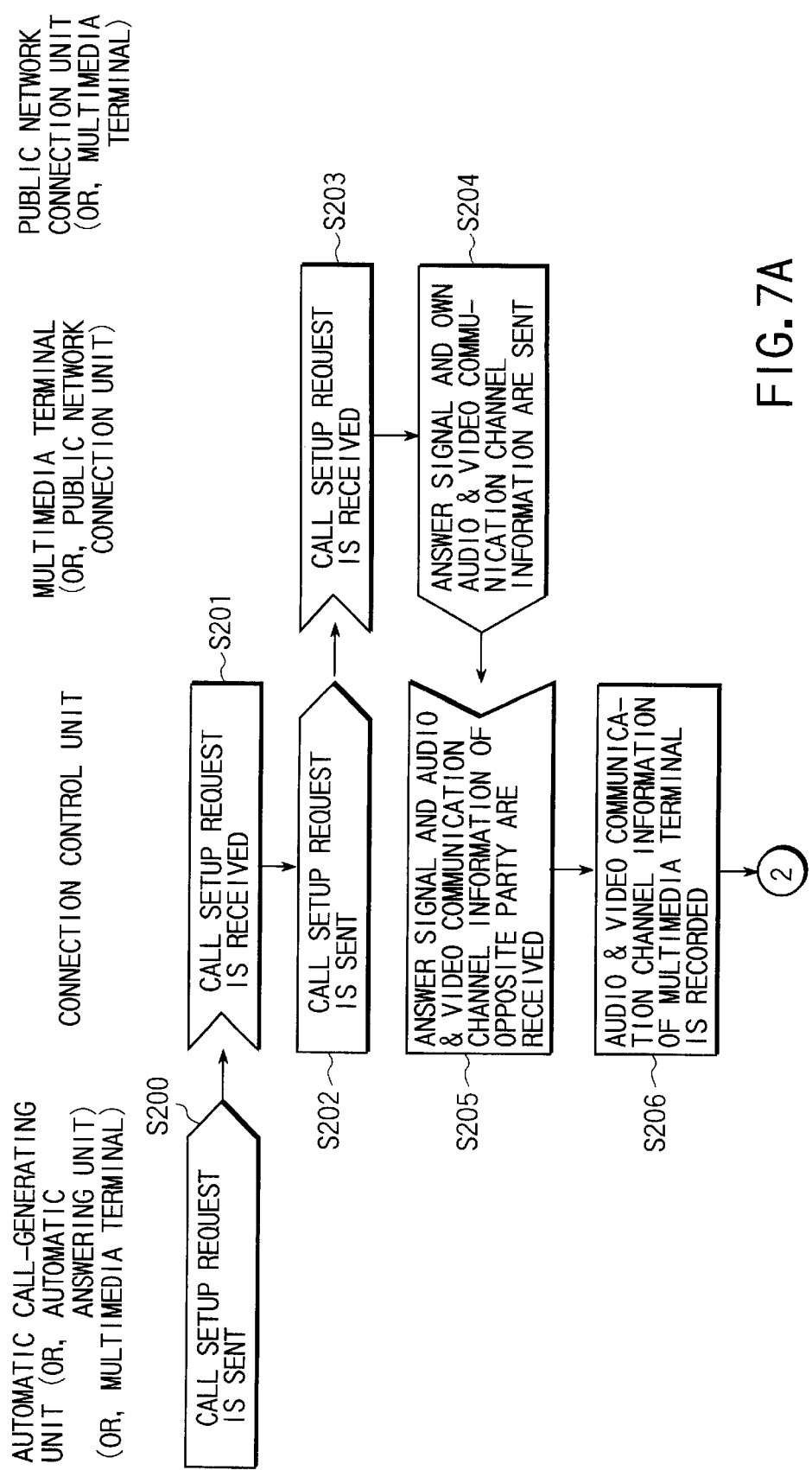
FIGS. 7A and 7B are diagrams showing an operation of the second embodiment of a coupling processing between terminals in an automatic call generation system or an automatic answering system according to the present invention.
Figure 7B:
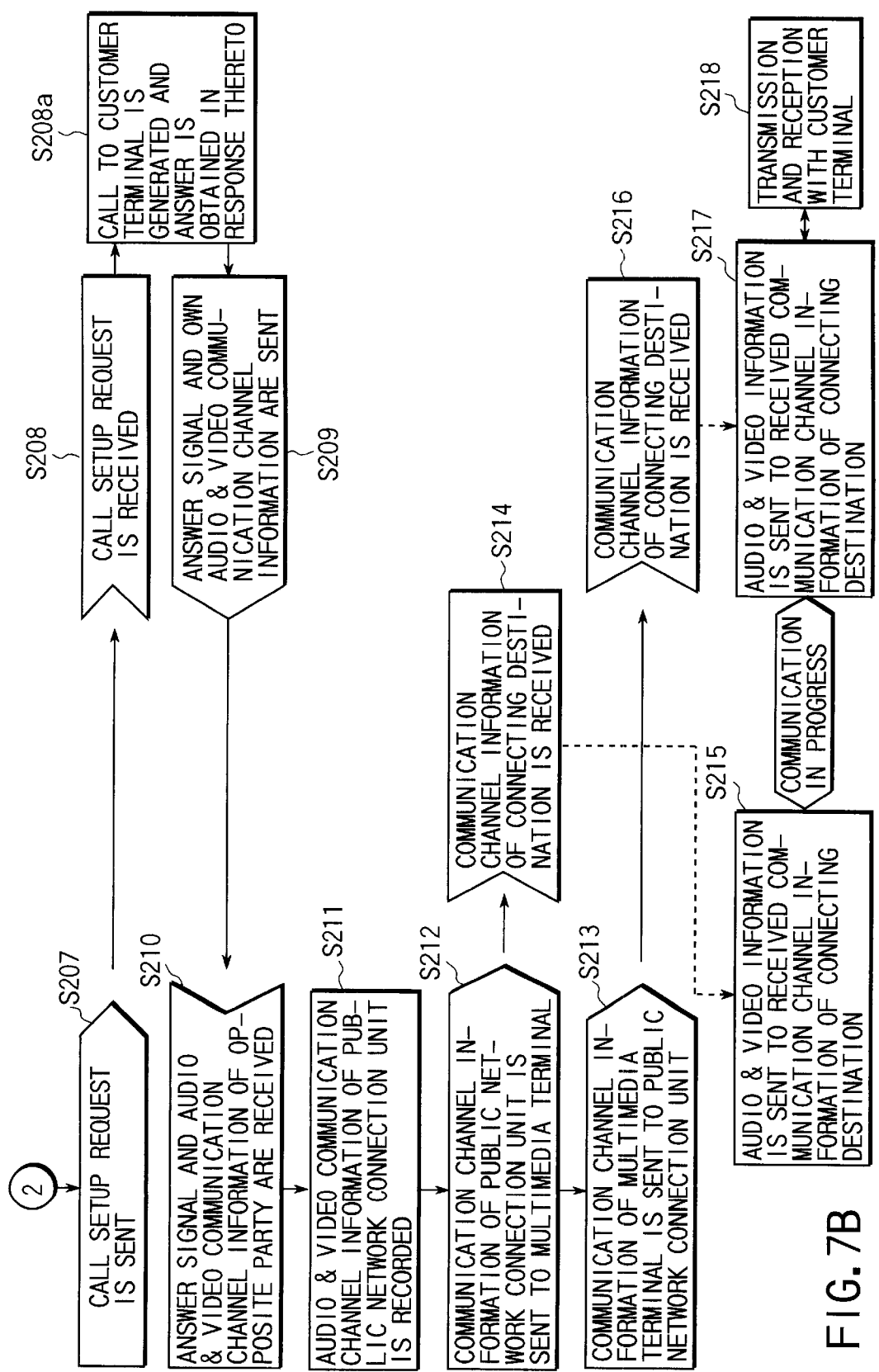
Figure 8A:
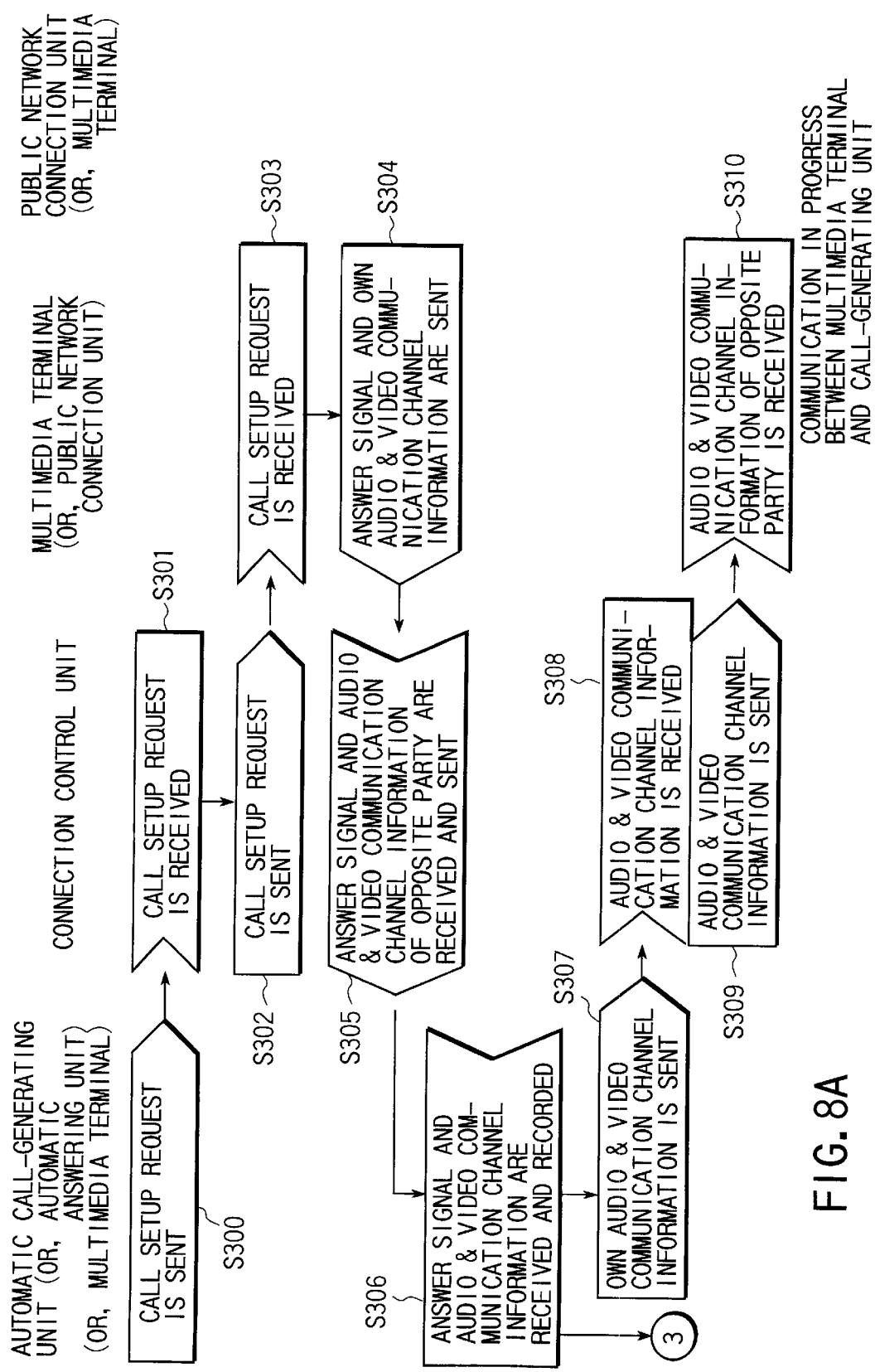
FIGS. 8A and 8B are diagrams showing an operation of the third embodiment of a coupling processing between terminals in an automatic call generation system or an automatic answering system according to the present inventions.
Figure 8B:
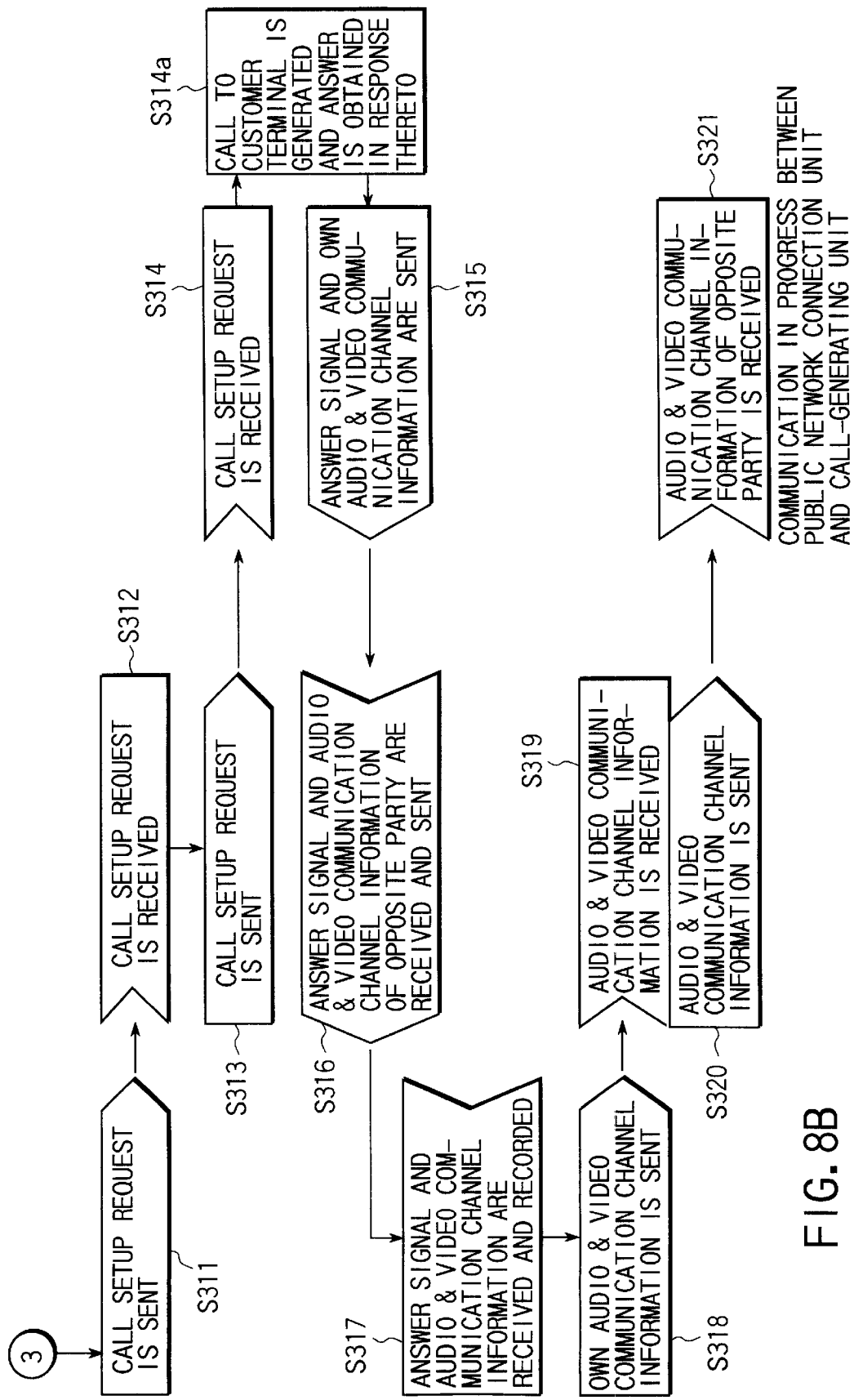

FIGS. 7A and 7B show the second embodiment of the present invention. In this second embodiment, the connection control unit 12 exerts a coupling control, in place of the automatic call-generating unit 11 or the automatic answering unit 13.

The automatic call-generating unit 11 sends a call setup request for the connection control unit 12 to the multimedia terminal unit (hereinafter referred to as the terminal 14a) and the public network connection unit 15a communicating with the customer terminals (S200). In this case, the plural transmitting operations will be performed, and thus a signal separate from the call setup request may be used. In the embodiment, this transmission will be implemented by providing a field in the user information setup area, etc., where a plurality of terminals or public network connection units are to be set up.

At the reception of the call setup request, the public network connection unit 12 creates, for example, the call ID No. of FIG. 6A, and transmits it first to the terminal 14a by using an ordinary call setup request (S201, S202). The terminal 14a receives the call setup request (S203) and sends an answer signal consisting of its telephone number, computer name, operator's name, etc., and the port No. and IP address used by the linked audio and video communication channel, as audio and video communication channel information (S204). The connection control unit 12 receives the answer signal and the audio and video communication channel information sent from the terminal 14a (S205), and records the audio and video communication channel information, telephone number, computer name, operator's name, etc., to the terminal ID number of the terminal 14a (S206). Incidentally, in the case where the transmission and reception of the answer signal and those of the audio and video communication channel information are conducted through separate communication channels, the communication channel information to be used for negotiation on the audio and video communication channel, encoding of audio and video, etc., may be included in the call control signals, such as call setup signals, answer signals, and so on. In this case, the information on the audio and video communication channel can be directly indicated to each terminal, without going through the connection control unit 12.

Figure 3:
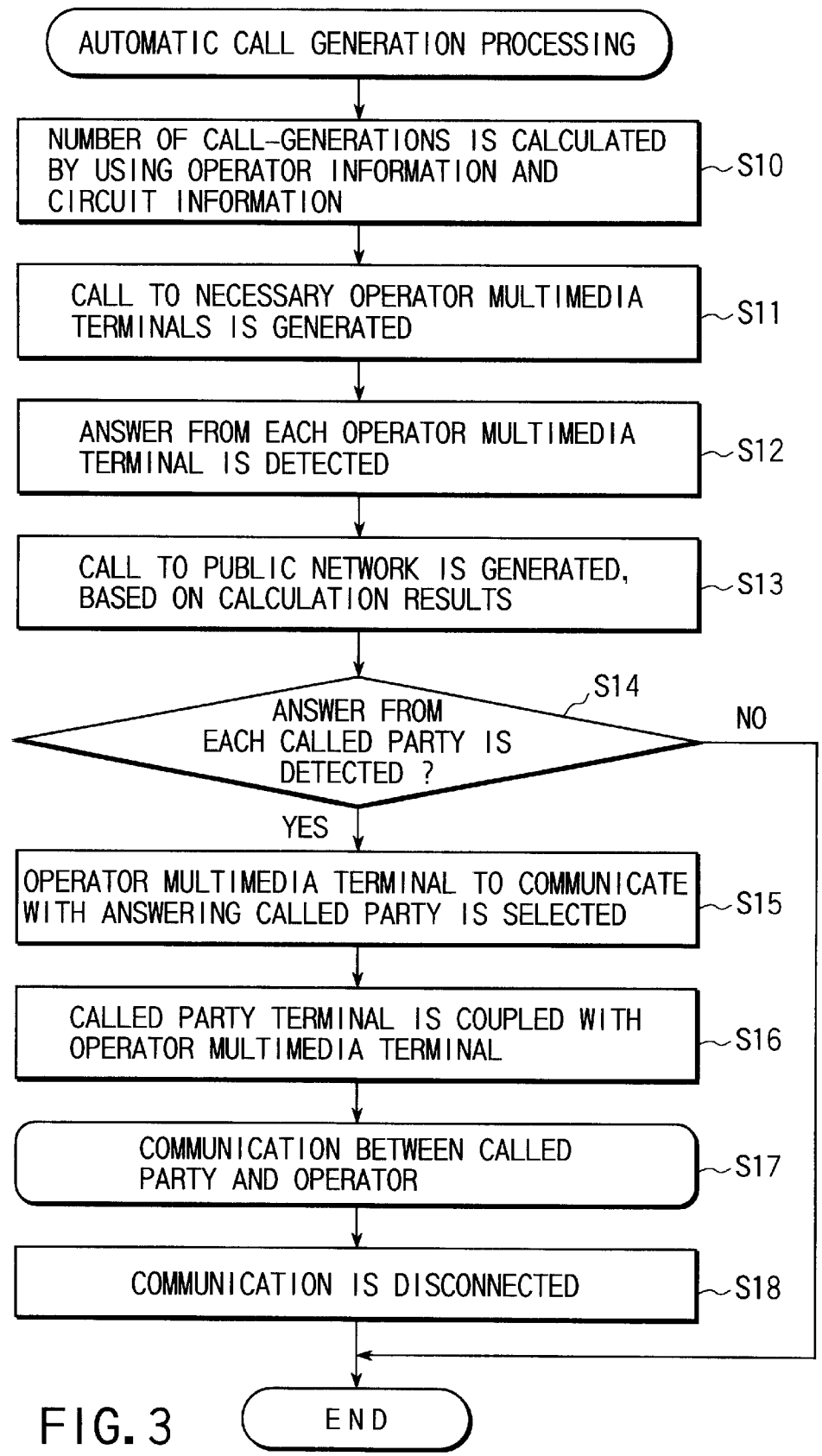
FIG. 3 is a flowchart showing a processing procedure in an automatic call generation system according to the present invention.

Then, the connection control unit 12 sends a call setup request to the public network connection unit 15a in order to connect with the customer terminal 17b which has been defined as the called party (or calling party) at Step S14 in FIG. 3 (or Step S21 in FIG. 4) (S207). At the reception of the call setup request, the public network connection unit 15a transmits the information to the customer terminal 17b already obtained via the public network 16 over the telephone line and obtains an answer from the customer terminal 17b (S208a). And, the public network connection unit 15a sends the answer signal and its own audio and video communication channel information (IP address, port No., etc.) to the connection control unit 12 (S209). The connection control unit 12 receives (S210) and records (S211) the answer and the audio and video communication channel information arriving from the public network connection unit 15a.

Then, the connection control unit 12 sends the audio and video communication channel information of the public network connection unit 15a to the terminal 14a (S212), and also sends the audio and video communication channel information of the terminal 14a to the public network connection unit 15a (S213). Consequently, the terminal 14a receives the audio and video communication channel information of the public network connection unit 15a (S214), and the public network connection unit 15a receives the audio and video communication channel information of the terminal 14a (S216). And, audio signals entered through the microphone of the terminal 14a, etc., or image information entered through a camera, etc., are sent to the public network connection unit 15a via the LAN 10 (S215). And, the public network connection unit 15a transmits the received audio and video signals to the customer terminal 17b by telephone line connection via the public network 16. Moreover, the audio and video information transmitted from the customer terminal 17b is similarly transmitted to the public network connection unit 15a via the public network 16 (S218). The public network connection unit 15a sends the received audio and video information to the terminal 14a via the LAN 10 (S217). In this way, the information communication channel between the terminal 14a and the public network connection unit 15a is established by the connection control unit 12. Thereafter, the terminal 14a and the customer terminal 17b are engaged in a call via the public network connection unit 15a, thereby giving rise to an exchange of requests and answers about various types of information providing services.

In the embodiment described above, the processings of Step S208a and Step S218 will be omitted in the case of a communication between multimedia terminals, transmissions being made directly from the multimedia terminals.

Moreover, in the case of a communication between public network connection units, similar transmission and reception to those of Step S208a will be conducted between Step S203 and Step S204. And, at Step S215, similar transmission and reception to those of Step S218 will be carried out.

Third Embodiment

FIGS. 8A and 8B, and FIGS. 9A and 9B show the third embodiment, wherein a coupling processing is implemented through the connection control unit 12 as in FIGS. 7A and 7B, but the automatic call-generating unit 11 (or the automatic answering unit 13) executes the connection control.

The automatic call-generating unit 11 sends the connection control unit 12 a call setup request directed to the multimedia terminal unit (hereinafter, referred to as the terminal 14a) (S300). At the reception of the call setup request, the connection control unit 12 sends the call setup request to the terminal 14a (S301, S302). The terminal 14a receives the call setup request from the connection control unit 12 (S303) and sends an answer signal consisting of its telephone number, computer name, operator's name, etc., and the port No. and IP address used by the linked audio and video communication channel, as audio and video communication information (S304). The connection control unit 12 receives the answer signal and the audio and video communication channel information arriving from the terminal 14a, and sends the received information to the automatic call-generating unit 11 (S305). The automatic call-generating unit 11 receives and records the answer signal and the audio and video communication information arriving from the connection control unit 12 (S306).

Then, the automatic call-generating unit 11 sends its own audio and video communication channel information to the connection control unit 12 (S307), and the connection control unit 12 receives it and sends it to the terminal 14a (S308, S309). The terminal 14a receives the audio and video communication channel information from the connection control unit 12 (S310). Consequently, the automatic call-generating unit 11 and the terminal 14a are coupled together and enabled to make a communication.

Furthermore, the automatic call-generating unit 11 sends a call setup request to the connection control unit 12 in order to connect with the customer terminal 17b which has been defined as the called party (or calling party) at Step S14 in FIG. 3 (or Step S21 in FIG. 4) (S311). The connection control unit 12 receives the call setup request (S312) and sends the call setup request to the public network connection unit 15a (S313). At the reception of the call setup request (S314), the public network connection unit 15a further generates a call to the customer terminal 17b via the public network 16 and obtains an answer (S314a). The public network connection unit 15a which has received the answer from the customer terminal 17b sends the answer signal and the audio and video communication channel information (IP address, port No., etc.) to the connection control unit 12 (S315). The connection control unit 12 receives the answer signal and the audio and video communication channel information from the public network connection unit 15a and sends the received information to the automatic call-generating unit 11 (S316). The automatic call-generating unit 11 receives and records (S317) the audio and video communication channel information arriving from the connection control unit 12 (S317).

The automatic call-generating unit 11 sends its own audio and video communication channel information to the connection control unit,12 (S318), and the connection control unit 12 receives it and sends it to the public network connection unit 15a (S319, S320). The public network connection unit 15a receives the audio and video communication channel information (S321). Consequently, the automatic call-generating unit 11 and the public network connection unit 15a are coupled together and enabled to make a communication.

Figure 9A:
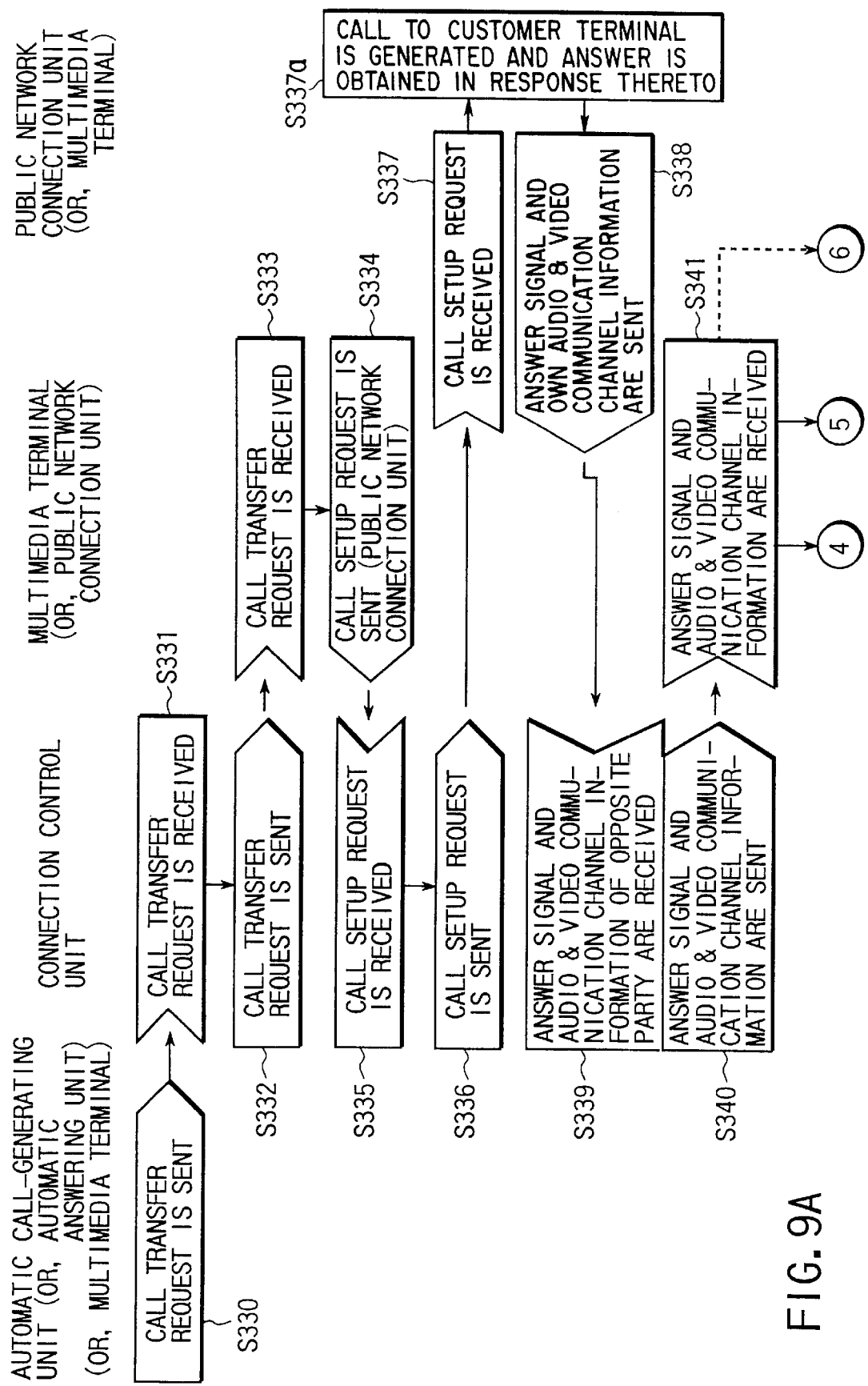
FIGS. 9A and 9B are diagrams showing the continuation of the third embodiment of the coupling processing between terminals in the automatic call generation system or the automatic answering system according to the present invention.
Figure 9B:
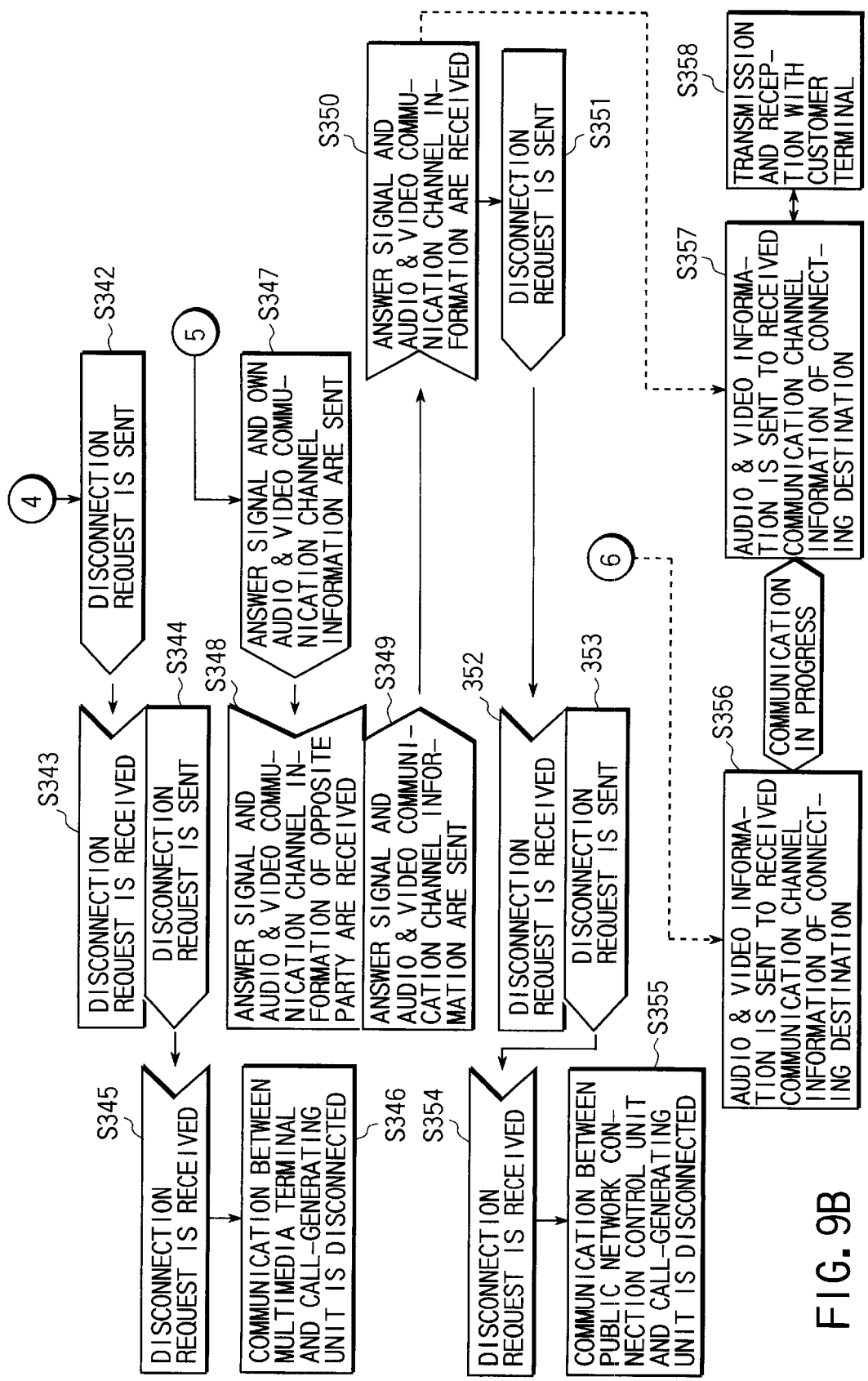

Then, the automatic call-generating unit 11 sends a transfer request to the connection control unit 12 in order to couple the terminal 14a and the public network connection unit 15a together for a call, as shown in FIG. 9A (S330). The connection control unit 12 which has received the transfer request from the automatic call-generating unit 11 sends the transfer request to the terminal 14a now ready to make a communication (S331, S332). This request may as well be sent simultaneously to the public network connection unit 15a. The terminal 14a receives the transfer request (S333) and sends a call setup request to the connection control unit 12 in order to secure a communication channel with the public network unit 15a (S334). This call setup request is meant to instruct that the call with the automatic call-generating unit 11 be disconnected after the connection with the terminal 14a, unlike the one dealt with at Steps S302 and S314. This can be implemented by various methods, among which are a method wherein the instruction to disconnect the communication between the terminal 14a and the automatic call-generating unit 11 is described in the user information area, a method wherein the information to identify the communication between the terminal 14a and the automatic call-generating unit 11 is described in the call setup request, and a method that uses separate signals, and so forth.

The connection control unit 12 receives the call setup request arriving from the terminal 14a (S335) and sends it to the public network connection unit 15a (S336). The public network connection unit 15a receives the call setup request (S337) and sends an answer signal and audio and video communication channel information to the customer terminal 17b, in a similar manner to an ordinary call reception (S337a). The public network connection unit 15a which has received the answer from the customer terminal 17b sends the answer signal and the audio and video communication channel information to the connection control unit 12 (S338). The connection control unit 12 receives the answer signal and the audio and video communication channel information from the public network connection unit 15a (S339) and relays that information to send it to the terminal 14a (S340). The terminal 14a records the received answer signal and the audio and video communication channel information (S341). And, as the terminal 14a recognizes that the answer signal and the audio and video communication channel information from the public network connection unit 15a have been received in response to the call setup request sent by itself before (S334), the terminal 14a sends a call disconnection request (S342). At the reception of the call disconnection request, the connection control unit 12 sends the request to the automatic call-generating unit 11 (S343, S344). The automatic call-generating unit 11 which has received the disconnection request processes the disconnection of the call with the terminal 14a (S345, S346).

Moreover, following the disconnection request, the terminal 14a sends its own audio and video communication channel information to the connection control unit 12 (S347). The connection control unit 12 which has received the audio and video communication channel information of the terminal 14a sends the information to the public network connection unit 15a (S348, S349). The public network connection unit 15a receives and records the call disconnection request (S350) and sends the call disconnection request to disconnect the call with the automatic call-generating unit 11 (S351). The connection control unit 12 which has received the call disconnection request sends the request to the automatic call-generating unit 11 (S352, S353). The automatic call-generating unit 11 which has received the disconnection request processes the disconnection of the call with the public network connection unit 15a (S354, S345).

This provides a call coupling between the terminal 14a and the public connection unit 15a using the mutual communication channels recorded at S341 and S350, thereby allowing the audio, video and other information communication to be executed (S356, S357). And, the public network connection unit 15a holds information communication with the customer terminal 17b via the public network 16 (S358).

In the embodiment described above, the processings of Step S314a, Step S337a and Step S358 will be omitted in the case of a communication between multimedia terminals, transmissions being made directly from the multimedia terminals.

Moreover, in the case of a communication between public network connection units, similar transmission and reception to those of Step S314a will be carried out between Step S303 and S304. And, at Step S356, similar transmission and reception to those of Step S358 will be conducted.

Fourth Embodiment

Figure 10A:
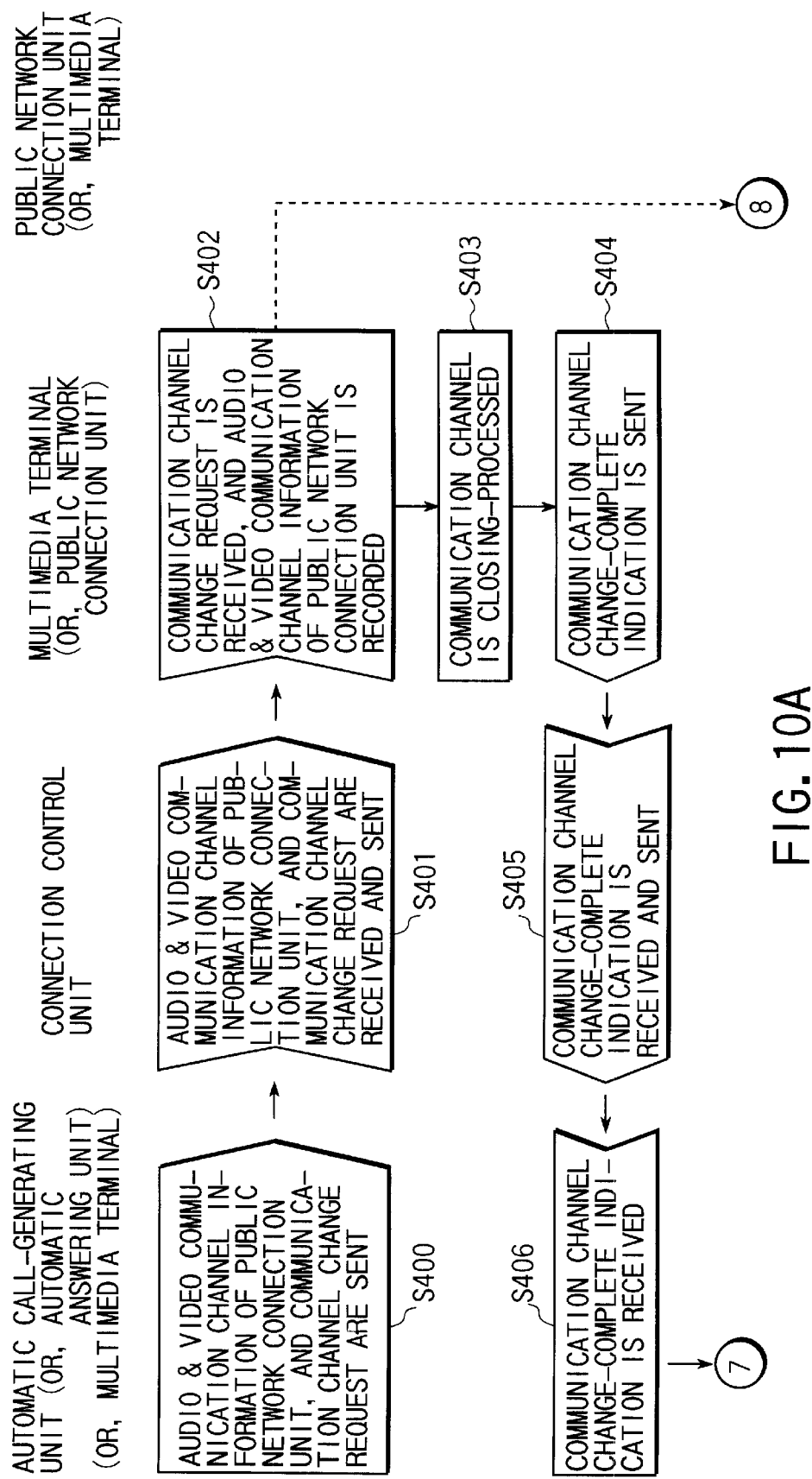
FIGS. 10A and 10B are diagrams showing an operation of the fourth embodiment of a coupling processing between terminals in an automatic call .generation system or an automatic answering system according to the present invention.
Figure 10B:
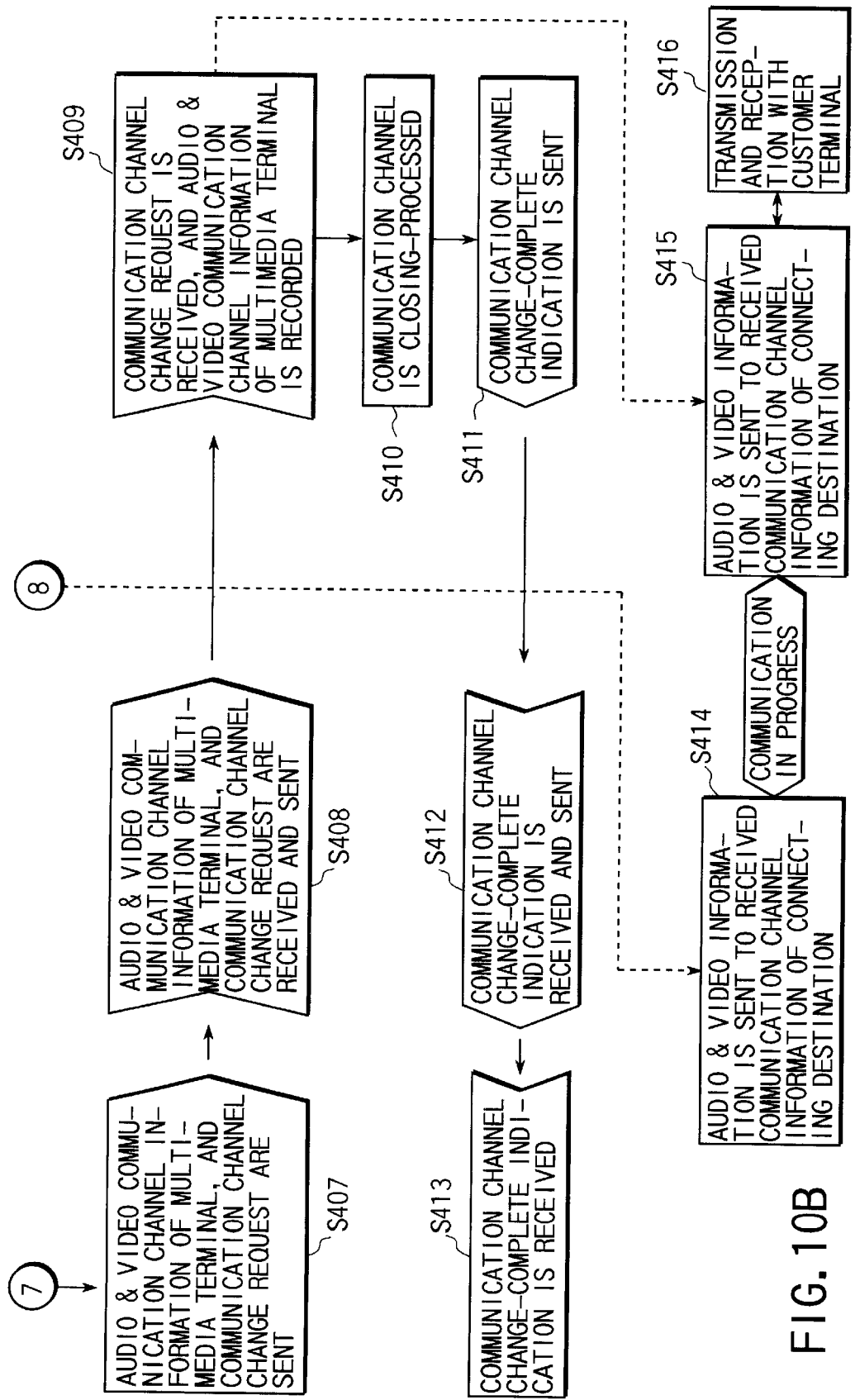

FIGS. 10A and 10B show the fourth embodiment of the present invention. This fourth embodiment connects an audio and video information line between a multimedia terminal (or a public network connection unit) and a public network connection unit (or a multimedia terminal), with the control signaling line being held on, after the control signaling line and the audio and video information line between the control units consisting of the automatic call-generating unit and connection control unit and the multimedia terminal (or the public network connection unit) and public network connection unit (or multimedia terminal) are connected.

First, connection of the control units consisting of the automatic call-generating unit and connection control unit to the multimedia terminal (or the public network connection unit) and public network connection unit (or multimedia terminal) is established by the control signaling line and the audio and video information line therebetween. This operation is identical to the procedure of Step S300 through Step S321 illustrated in FIG. 8B. Therefore, its drawings and description of operation are omitted here. The following description is given with reference to FIGS. 10A and 10B, presupposing that the control signaling line and the audio and video information line between the control units and the multimedia terminal (or the public network connection unit) and public network connection unit (or multimedia terminal) have been established.

Next, while the connection between the terminal 14a and the public network connection unit 15a is maintained (control signaling line), and for the purpose of connecting the audio and video information line between the terminal 14a and the public network connection unit 15a, the automatic call-generating unit 11 sends a communication channel change request to the terminal 14a for switching the interlocutor of communication from the automatic call-generating unit 11 to the public network connection unit 15a. Moreover, the automatic call-generating unit 11 also sends the received audio and video communication channel information (namely, information on the audio and video information line) of the public network connection unit 15a to the connection control unit 12, so that it is transmitted to the terminal 14a (S400).

The connection control unit 12 which has received the communication channel change request and the audio and video communication channel information of the public network connection unit 15a from the automatic call-generating unit 11 sends the request and information to the terminal 14a (S401). The terminal 14a records the audio and video communication information of the public network connection unit 15a (S402) and, at the same time, executes closing processing of the communication channel with the automatic call-generating unit 11 (S403), and then issues a communication channel change-complete indication (S404). The connection control unit 12 which has received the communication channel change-complete indication sends this indication to the automatic call-generating unit 11 (S405), and the automatic call-generating unit 11 receives it and terminates the communication of audio and video information. The automatic call-generating unit 11 which has received the communication channel change-complete indication sends a communication channel change request to the public network connection unit 15a for switching the interlocutor of communication from the automatic call-generating unit 11 to the terminal 14a. The automatic call-generating unit 11 also sends the received audio and video communication channel information (namely, information on the audio and video information line) of the terminal 14a to the connection control unit 12, so that it is transmitted to the public network connection unit 15a (S407).

The connection control unit 12 which has received the communication channel change request and the audio and video communication channel information of the terminal 14a from the automatic call-generating unit 11 sends the request and information to the public network connection unit 15a (S408). The public network connection unit 15a records the audio and video communication channel information of the terminal 14a (S409) and, at the same time, executes closing processing of the communication channel with the automatic call-generating unit 11 (S410), and then issues a communication channel change-complete indication (S411). The connection control unit 12 which has received the communication channel change-complete indication sends this indication to the automatic call-generating unit 11 (S412), and the automatic call-generating unit 11 receives it and terminates the communication of audio and video information (S413).

Consequently, the terminal 14a records the audio and video communication channel information of the public network connection unit 15a at S402, and the public network connection unit 15a records the audio and video communication channel information of the terminal 14b at S409. This completes the coupling of the audio and video communication channel between those two. Thereafter, a communication of audio and video information is carried on, according to the audio and video path information of both (S414, S415). And, the public network connection unit 15a holds information communication with the customer terminal 17b via the public network 16 (S416).

In the embodiment described above, the communication channel change request may as well be issued through a communication channel that is directly connected between the terminal 14a and the public network connection unit 15a, and the automatic call-generating unit 11, without going through the connection control unit 12, in a similar manner to the coded audio and video information. Moreover, in the case of a communication between multimedia terminals, the processing of Step S416 will be omitted, and the request will directly be sent from the multimedia terminals. Also in the case of a communication between public network connection units, a similar communication to the one that takes place at Step S416 will be carried out at Step S414.

The embodiments described above deal with call connections between one terminal and another, but the connections may as well be made between a plurality of terminals and a plurality of terminals. This is made possible by providing means for recording multiple pieces of terminal information on the terminal to be connected (connecting destination A) and the terminal to be connected (connecting destination B). In this case, the information is transmitted to the terminals designated as connecting destination A and connecting destination B or to terminals on the public network, and the terminal of connecting destination A that answers and the terminal of connecting destination B that answers, are connected successively.

Moreover, when a connecting destination is changed, various methods can be employed, such as a method wherein both or one of the terminals are put on hold, so that the voice of the terminals may not be heard, as in the case of the ordinary telephony, or a method wherein sound information, such as voice and music, which is stored in the memory of the automatic call-generating unit, answering unit or an external storage unit, is read and output to the terminals, or a method wherein silent data are sent. Moreover, a call holding may be switched on when a transfer operation to a transfer destination is started.

Next, a processing to indicate a state, as to whether the multimedia terminal unit 14 currently used by the operator is idle or busy, to the automatic call-generating unit and automatic answering unit will be described below.

Figures 11, 12:
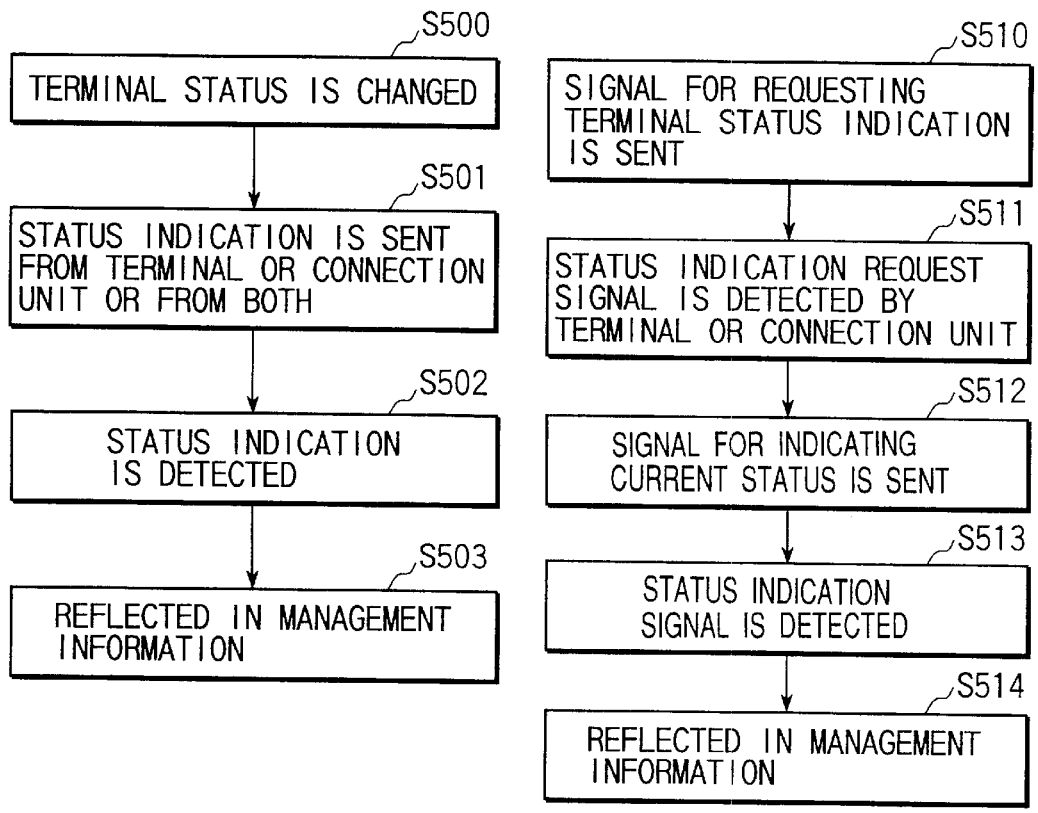
FIG. 11 is a flowchart showing a processing procedure to indicate a terminal status as it changes in an automatic call generation system or an automatic answering system according to the present invention.
FIG. 12 is a flowchart showing a processing procedure to indicate a terminal status in response to a terminal status indication request in an automatic call generation system or an automatic answering system according to the present invention.
Figure 13:
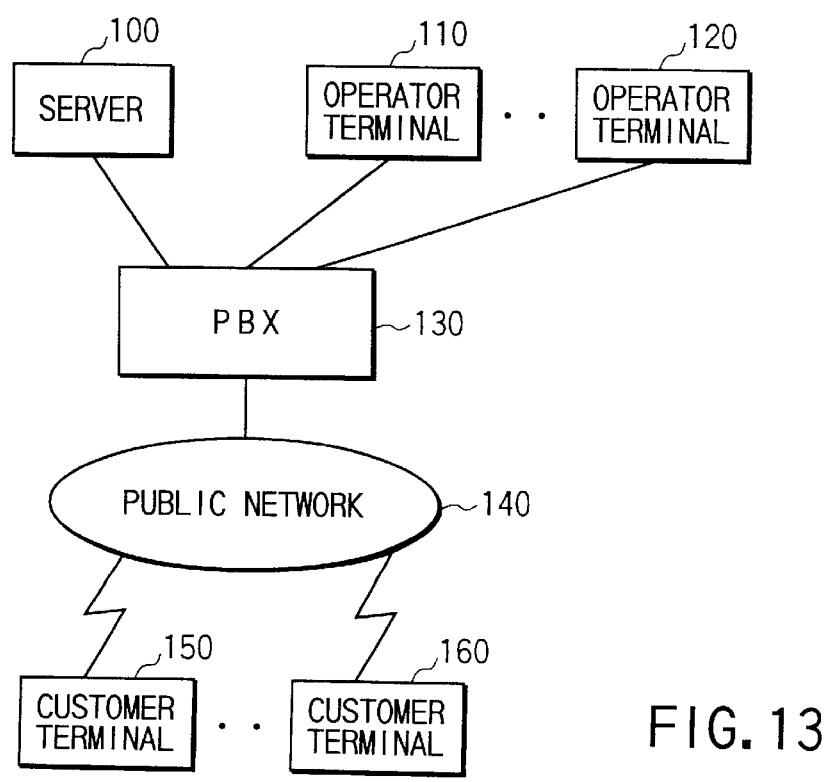
FIG. 13 is a diagram showing a conventional communication system.

FIG. 11 is a flowchart showing the processing which is performed to indicate the status of a terminal as it changes.

When a status change occurs in any of the multimedia terminal units 14 used by operators, resulting from a call connection, disconnection, and so on (S500), that terminal in itself or the connection control unit 12 issues a signal indicating the status of the terminal (S501). The automatic call-generating unit 11 or the automatic answering unit 13 detects this terminal status change signal (S502) and reflects it in the management information (S503). This allows, for example, to assign a request from a customer terminal to an operator terminal that has turned idle.

FIG. 12 is a flowchart showing the procedure by which a terminal status is indicated against a terminal status indication request. The automatic call-generating unit 11 and the automatic answering unit 13 issue a terminal status indication request to the multimedia terminal unit of each operator in order to recognize the status of the terminal at a given timing (S510). At the reception of the terminal status indication request (S511), the terminal in itself or the connection control unit 12 which manages the connection of the terminal issues a status indication signal representing the current status (S512). The automatic call-generating unit 11 or the automatic answering unit 13 detects this status indication signal (S513) and reflects it in the management information (S514).

As describe above, in a communication system according to the present invention, more than one multimedia terminal connected to a public network and having a function to send/receive audio or video or audio and video information, a multimedia terminal located on a LAN and having a function to send/receive audio and video information, a public network connection unit having a function to send/receive information between a public network and a LAN, or a plurality of multimedia terminals and a plurality of public network connection units are arranged on a network. According to the present invention, the communication system is allowed to provide connection between the multimedia terminals, between the multimedia terminal and the public network connection unit, or between the public network connection units by using a control unit (an automatic call-generating unit, an automatic answering unit, a connection control unit, a terminal unit, or a unit comprising a combination thereof).

Moreover, according to the present invention, it is readily possible to implement communication coupling by sending a call setup request from the control unit to the units desired to be interconnected, and indicating the communication channel information contained in their answer signals to a first connection unit and a second connection unit.

Moreover, according to the present invention, it is readily possible to implement communication coupling by sending a call setup request from the control unit to the first and second connection units desired to be interconnected, by receiving the communication channel information contained in their answer signals, and thereafter, by indicating the mutual communication channel information between the first connection unit and the second connection unit, pursuant to a communication channel transfer request, while disconnecting all the communication channels between the control unit and the first connection unit and between the control unit and the second connection unit.

Moreover, according to the present invention, it is possible to couple a communication channel for audio and video signals between the first connection unit and the second connection unit desired to interconnect, while the control line between the control unit and the first and second connection units is held on, by sending a call setup request from the control unit to the first and second connection units, by receiving the communication channel information contained in the received answer signals and establishing the connection, and by indicating the communication channel information and communication channel transfer request of the second connection unit to the first connection unit, and indicating the communication channel information and communication channel transfer request of the first connection unit to the second connection unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication channel coupling method in a communication system wherein one or a plurality of multimedia terminals having a function to send/receive audio or video or audio and video, one or a plurality of public network connection units having a function to send/receive audio and video between the multimedia terminal and the public network connection unit or between a public network and a LAN, and a control unit are arranged on the LAN, said method being arranged to provide connection between the multimedia terminals, between the multimedia terminal and the public network connection unit, or between the public network connection units, and comprising the steps of:

causing the control unit to send a call setup request to a first connection unit, and then to record audio and video communication channel information of the first connection unit which is obtained in response to the call setup request, so as to establish an audio and video communication channel;

causing the control unit to send the call setup request to a second connection unit, and then to record audio and video communication channel information of the second connection unit which is obtained in response to the call setup request, so as to establish an audio and video communication channel;

causing the control unit to send the audio and video communication information of the second connection unit to the first connection unit;

causing the control unit to send the audio and video communication information of the first connection unit to the second connection unit; and establishing communication between the first connection unit and the second connection unit.

2. A communication channel coupling method in a communication system wherein one or a plurality of multimedia terminals having a function to send/receive audio or video or audio and video, one or a plurality of public network connection units having a function to send/receive audio and video between the multimedia terminal and the public network connection unit or between a public network and a LAN, and a control unit are arranged on the LAN, said method being arranged to provide connection between the multimedia terminals, between the multimedia terminal and the public network connection unit, or between the public network connection units, and comprising the steps of:

causing the control unit to send a first call setup request to a first connection unit, and to mutually send/receive communication channel information therebetween;

causing the control unit to send the first call setup request to a second connection unit, and to mutually send/receive communication channel information therebetween;

causing the control unit to send a transfer request to the first connection unit, after communication between the control unit and the first and second connection units is established;

causing the first connection unit, which has received the transfer request, to send a second setup request to second connection unit, so as to cause the first and second connection units in response thereto to mutually send/receive communication channel information therebetween through the control unit;

causing the first and second connection units to disconnect communication with the control unit, after the first and second connection units mutually receive the communication channel information therebetween; and establishing communication between the first connection unit and the second connection unit.

3. A communication channel coupling method in a communication system wherein one or a plurality of multimedia terminals having a function to send/receive audio or video or audio and video, one or a plurality of public network connection units having a function to send/receive audio and video between the multimedia terminal and the public network connection unit or between a public network and a LAN, and a control unit are arranged on the LAN, said method being arranged to provide connection between the multimedia terminals, between the multimedia terminal and the public network connection unit, or between the public network connection units, and comprising the steps of:

causing the control unit to send a call setup request to first and second connection units, and to mutually send/receive communication channel information therebetween;

causing the control unit to send the communication channel information of the second connection unit and a communication channel change request to the first connection unit, and to send the communication channel information of the first connection unit and the communication channel change request to the second connection unit, after communication between the control unit and the first and second connection units is established;

causing the first and second connection units, which have received the communication channel change request, to record the communication channel information of the second and first connection units, respectively, and to terminate communication with the control unit; and establishing information communication through a communication channel thus changed between the first connection unit and the second connection unit.

4. The communication channel coupling method according to claim 1, 2, or 3, wherein the control unit accepts a transmission request from the multimedia terminal or the public network connection unit before sending information to the first connection unit or the second connection unit, and decides a receiving party, according to receiving party information which is described in the transmission request issued from the multimedia terminal or the public network connection unit.

5. The communication channel coupling method according to claim 4, wherein, when the multimedia terminal issues a request to the control unit, it sends identification information of a multimedia terminal to be connected or a telephone number of a terminal on the public network to be connected.

6. The communication channel coupling method according to claim 1, 2, or 3, wherein the control unit generates a call to a plurality of multimedia terminals and selects a multimedia terminal which first answers as the first or second connection unit.

7. The communication channel coupling method according to claim 1, 2, or 3, wherein, if information on a plurality of terminals is received as that of the first and second connection units, transmission is made to multimedia terminals or terminals on the public network which were designated as the first and second connection units by the control unit, and answering terminals of the first connection unit and answering terminals of the second connection unit are connected successively.

8. The communication channel coupling method according to claim 1, 2, or 3, wherein the control unit generates a call to a plurality of multimedia terminals or terminals on the public network, and selects a multimedia terminal or a terminal on the public network which first answers as the first or second connection unit.

9. A communication system wherein one or a plurality of multimedia terminals having a function to send/receive audio or video or audio and video, one or a plurality of public network connection units having a function to send/receive audio and video between the multimedia terminal and the public network connection unit or between a public network and a LAN, and a control unit are arranged on the LAN, said control unit being arranged to control connection between the multimedia terminals, between the multimedia terminal and the public network connection unit, or between the public network connection units, and comprising:

means for sending a call setup request to a first connection unit, and then recording audio and video communication channel information of the first connection unit which is obtained in response to the call setup request, so as to establish an audio and video communication channel;

means for sending the call setup request to a second connection unit, and then recording audio and video communication channel information of the second connection unit which is obtained in response to the call setup request, so as to establish an audio and video communication channel;

means for sending the audio and video communication information of the second connection unit to the first connection unit; and means for sending the audio and video communication information of the first connection unit to the second connection unit.

10. A communication system wherein one or a plurality of multimedia terminals having a function to send/receive audio or video or audio and video, one or a plurality of public network connection units having a function to send/receive audio and video between the multimedia terminal and the public network connection unit or between a public network and a LAN, and a control unit are arranged on the LAN, in order to control connection between the multimedia terminals, between the multimedia terminal and the public network connection unit, or between the public network connection units, said system comprising:

means for causing the control unit to send a first call setup request to a first connection unit, and to mutually send/receive communication channel information therebetween;

means for causing the control unit to send the first call setup request to a second connection unit, and to mutually send/receive communication channel information therebetween;

means for causing the control unit to send a transfer request to the first connection unit, after communication between the control unit and the first and second connection units is established;

means for causing the first connection unit, which has received the transfer request, to send a second setup request to second connection unit, so as to cause the first and second connection units in response thereto to mutually send/receive communication channel information therebetween through the control unit; and means for causing the first and second connection units to disconnect communication with the control unit, after the first and second connection units mutually receive the communication channel information therebetween.

11. A communication system wherein one or a plurality of multimedia terminals having a function to send/receive audio or video or audio and video, one or a plurality of public network connection units having a function to send/receive audio and video between the multimedia terminal and the public network connection unit or between a public network and a LAN, and a control unit are arranged on the LAN, in order to control connection between the multimedia terminals, between the multimedia terminal and the public network connection unit, or between the public network connection units, said system comprising:

means for causing the control unit to send a call setup request to first and second connection units, and to mutually send/receive communication channel information therebetween;

means for causing the control unit to send the communication channel information of the second connection unit and a communication channel change request to the first connection unit, and to send the communication channel information of the first connection unit and the communication channel change request to the second connection unit, after communication between the control unit and the first and second connection units is established; and means for causing the first and second connection units, which have received the communication channel change request, to record the communication channel information of the second and first connection units, respectively, and to terminate communication with the control unit.

12. The communication system according to claim 9, 10, or 11, wherein a multimedia terminal, a public network connection unit or a connection control unit connected to the LAN that does not correspond to the first connection unit or second connection unit serves as the control unit.

13. The communication system as according to claim 9, 10, or 11, wherein the control unit accepts a transmission request from the multimedia terminal or the public network connection unit before sending information to the first connection unit or the second connection unit, and decides a receiving party, according to receiving party information which is described in the transmission request issued from the multimedia terminal or the public network connection unit.

14. The communication system according to claim 9, 10, or 11, wherein IP (Internet Protocol) packets, such as TCP (Transmission Control Protocol), UDP (User Datagram Protocol), etc., or other data communication packets are used for the communication channel information and communication of audio and video information.

15. The communication system according to claim 9, 10, or 11, wherein IP addresses or port Nos. are used as the communication channel information.

16. The communication system according to claim 9, 10, or 11, wherein, every time the first or second connection unit undergoes a status change, the corresponding status indication signal is sent to the control unit.

17. The communication system according to claim 9, 10, or 11, wherein the control unit sends a status inquiry request to the first and second connection units, and the first and second connection units answer the control unit with their status information in response to the inquiry request.

* * * * *